United States Patent [19]

Blomberg

[11] 4,228,325
[45] Oct. 14, 1980

[54] TELEPHONE SET

[76] Inventor: Knut H. Blomberg, Lokattsvägen 39, S-161 37, Bromma, Sweden

[21] Appl. No.: 916,748

[22] Filed: Jun. 19, 1978

[30] Foreign Application Priority Data

Jul. 5, 1977 [SE] Sweden ............................... 7707799

[51] Int. Cl.² .................................................. H04M 1/02
[52] U.S. Cl. ............................. 179/100 R; 179/100 D; 179/179
[58] Field of Search ........... 179/100 R, 100 D, 100 C, 179/100 L, 103, 146 R, 147, 178, 184, 179, 183; D14/53, 56, 59, 63

[56] References Cited

U.S. PATENT DOCUMENTS

| D. 135,495 | 4/1943 | Giannini | 179/100 L |
|---|---|---|---|
| D. 152,278 | 1/1949 | McKenna | 179/100 R |
| D. 154,487 | 7/1949 | Hose | D14/53 |
| D. 184,307 | 1/1959 | Dreyfuss et al. | D14/53 |
| D. 208,702 | 9/1967 | Tini | D14/53 |
| D. 245,500 | 8/1977 | Fukushima et al. | D14/53 |
| D. 246,784 | 12/1977 | Fukushima et al. | D14/53 |
| 2,508,642 | 5/1950 | Herrick | 179/103 |
| 2,949,509 | 8/1960 | Whidden | 179/100 C |
| 2,952,739 | 9/1960 | Lehman | 179/147 |
| 3,928,723 | 12/1975 | Kai | 179/100 L |
| 4,056,696 | 11/1977 | Meyerle et al. | 179/100 R |

OTHER PUBLICATIONS

Washington Post Advertisement, Washington Post Magazine, Apr. 16, 1978.

Primary Examiner—James W. Moffitt
Assistant Examiner—Randall P. Myers
Attorney, Agent, or Firm—Hane, Roberts, Spiecens & Cohen

[57] ABSTRACT

A telephone set adapted to provide the calling person with a convenient grip of the hand set. The seat accommodating the handle is shaped as a channel whose sides surround the handle along its middle part so that the person making the telephone call cannot seize this part but, instead, will seize the lower (microphone) part.

4 Claims, 5 Drawing Figures

TELEPHONE SET

FIELD OF THE INVENTION

The invention relates to a telephone set.

BACKGROUND

Ever since telephone sets at the end of the 19th century were equipped with hand sets, these sets have been constructed with a cradle in which a hand set is placed when there is no conversation. The cradle was made movable in the fixed part of the telephone set but ever since telephone sets were made of bakelite in the thirties it is now usually designed as a fixed seat in the casing of the set. The hand set, the cradle and the seat are presently designed in such a manner that the person intending to make a call can seize the handle which joins the earphone and the microphone case of the hand set in a confortable manner and lift it to make a telephone call.

However, it often happens that the person making the telephone call, during the course of the conversation, moves the grip of his hand from the middle of the handle and instead seizes the lower part of the hand set, that is the part carrying the microphone. The reason is that the fingers of the hand in this manner will be clear of the check and that the lower it is possible to hold the hand set while maintaining the position of the receiver at the ear, the less it is necessary to raise the arm and the more comfortable is it to make the conversation. A well-suited telephone set for this purpose should therefore be constructed in such a way that the person who is making the telephone call, contrary to using conventional telephone sets, at the seizing of the hand set seizes the hand set at its lower part instead of seizing it around the middle of the handle.

SUMMARY OF THE INVENTION

According to the present invention this is attained by designing the casing of the set and the hand set relative to each other so that when the hand set rests in the seat, the person intending to make a call cannot, or only with great effort, seize the middle part of the hand set, whereas the end of the microphone is left free to be seized.

This is suitably attained by a construction of the cradle/seat of the casing of the set which is completely different from known telephone sets. The characteristic feature of the invention is that is consists of a channel the sides of which surround the handle portion of the hand set at its middle part in such a way, for example to such a height, that the person making the telephone call cannot seize this part of the handle and in a conventional manner lift the hand set. The design of the hand set adapted to such a casing is facilitated due to the properties of modern plastic materials implying reduced weight and dimensions of the enclosed components which renders it possible to make hand sets even lighter and consequently implying greater freedom in design.

BRIEF DESCRIPTION OF THE VIEW OF THE DRAWING

The invention will be described in greater detail with reference to the accompanying drawing.

FIG. 1 digrammitacilly illustrates a conventional telephone set,

FIG. 2 a corresponding set according to the invention without the hand set, FIG. 2A the set of FIG. 2 with the hand set, FIGS. 3 and 4 a set according to the invention with the hand set respectively removed from the base and installed thereon the same set as a wall-set.

DETAILED DESCRIPTION

Figure 1:
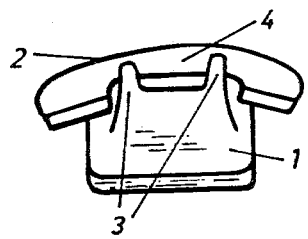

FIG. 1 shows the basic design of a modern table-set telephone of conventional type made of plastic. The casing (1) of the set is designed with a rigid seat for the hand set (2) in the shape of two cradle-shaped holders (3) in which the handle portion (4) of the hand set rests and in which the control elements of the switch are disposed. Between the two holders there is a free space on both sides of and under the middle part of the handle portion so that the person who is making the telephone call can comfortably seize the handle and lift the hand set. In certain types of telephone sets, the recess on the front side between the holders is smaller but, since the middle of the handle portion is clear on its rear and lower sides, it is easy to seize the handle portion.

Figure 2:
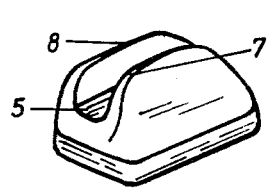
Figure 2A:
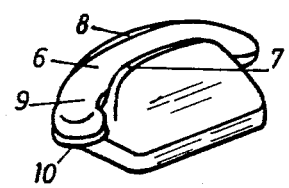

FIG. 2 shows a corresponding set according to the principle of the invention. Instead of having a cradle-shaped holder at each end of the handle, the seat is designed as a longitudinal channel (5) in the casing of the set in order to accomodate the middle part (6) of the handle. The hand set, when resting on the casing of the set, has its handle on the bottom of the channel, thus controlling the switch. The handle rests so deeply that the walls (7, 8) of the channel prevent the person making the telephone call from seizing the handle. Consequently, it is impossible for the person to lift the hand set in a traditional way but is, instead, forced to seize the free mouthpiece or microphone part (9), whereby the grip of the hand, already from the beginning, is more comfortable for the telephone user.

The hand set shown in FIG. 2 is a conventional type having a round mouthpiece case (10) and is not very well suited for telephone sets according to the invention. Instead the design of the microphone case is adapted to the design of the casing in order to make the handling of it the best possible.

Figure 3:
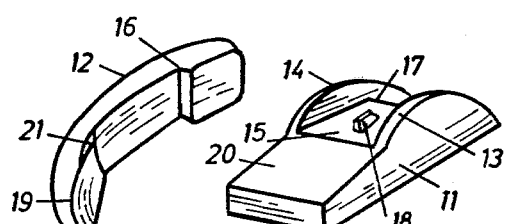
Figure 4:
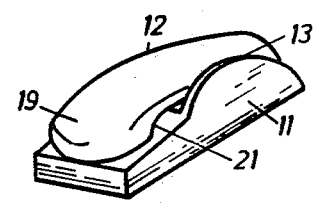

FIGS. 3 and 4 show a telephone set where such an adaptation has been carried out. The set is of the type in which the hand set is placed in the same direction as the axial line of the casing of the seat. This type, differing from the conventional type of a telephone set having a transversely situated hand set, has been utilized in some new models of sets which have been designed in the last few years. It gives the designer a greater freedom since it is not necessary to consider the fact that the hand set can be placed both from the left and from the right side and this type is better suited to be used as a table-set as well as a wall-set.

The casing (11) as well as the hand set have a longitudinal shape. The casing is provided with two flanges (13, 14) which together with the upper side (15) of the casing constitute the channel which is the characteristic feature of the invention. When the hand set is placed in the channel the flanges project alongside the middle part of the handle to such a height that their edges prevent the person making the telephone call from seizing the handle 12 thereat. The handle has a fairly flat section having a width which is substantially the same as the ends of the earphone and the microphone 19. Therefore the hand set also has plenty of space for the rest of the components of the transmission circuit, being arranged for example on a circuit card. The earphone portion has a ridge which forms a stop (16) for the handle which, when the hand set is placed on the casing, abuts against the edge (17). The control button of the switch is arranged at the bottom of the channel. On the front side (20) of the casing, the pulse transmitter is arranged in the shape of a dial or push-buttons.

The lower part or microphone of the hand set is shaped as a relatively broad portion (19) the inside of which can suitably rest, for example alongside the back edge, can rest upon the upper side of the casing while, otherwise, it is completely free to be seized. In order to lift the hand set, the user seizes portion 19 while placing the thumb of the hand along one of the side surfaces and the rest of the fingers along the other side surface and the end of the handset rests on the wrist. Bowe-shaped recesses (21) are arranged at the edges formed between the mouthpiece portion 19 and the handle 12 to receive the finger ends and to make the grip as effective as possible. The grip will be such that the hand set, more or less automatically will swing in the hand from the horizontal position on the casing of the set to the vertical position needed during use and only a minor bending backwards of the hand is required. At the same time the hand set is kept in a comfortable grip without any risk of the fingers involuntarily covering the sound lead-in of the hand set i.e. the sound inlet of the mouthpiece.

Figure 5:
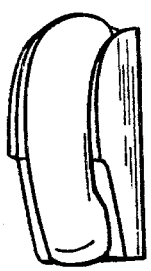

FIG. 5 shows the set as a wall-set.

The described telephone sets are only to be considered as embodiments of a new type which can be varied in different ways without departing from the principle of the invention. The casing of the set can vary in shape and size according to the functions the set is to fulfil, for example: both low-speaking and loud-speaking, chief's and secretary set, multiline telephone set, operator's set etc.

The channel shaped seat with its flanges being shaped as part of the plastic casing can be designed as a separate part, being mounted on the casing. Nor is it necessary to construct the flanges as complete walls to prevent or to render it difficult to seize the hand set at its middle part.

They can also be designed as a movable cradle or be separated from the seat accomodating the hand set.

The hand set which is shown is also only one embodiment. The design of the hand set depends on which type of receiver and microphone that is used and whether it shall contain a pulse transmitter in the form of a dial or as push buttons.

We claim:

1. A telephone set comprising a base, and a handset supportable on the base, said handset including a lower microphone part, an upper earphone part and a connecting handle part, said base including a cradle in which said handset can be supported at rest in a position in which the microphone part and earphone part project beyond the cradle and face downwardly, said cradle including upwardly projecting flanges forming a groove therebetween, which flanges flank said handle part over at least a major part of the length thereof and extend at least the height thereof to prevent the handle part of the handset from being engaged to lift the handset from the base, said lower microphone part being shaped and proportioned such that it is enlarged with respect to said handle part and forms bowl-shaped recesses at the edges formed between the microphone part and the handle part, said recesses receiving the ends of fingers of the hand gripping the microphone part without covering the sound inlet of the microphone part.

2. A telephone set as claimed in claim 1 wherein said cradle has a lateral edge beyond which said earphone part projects in the supported position of the handset, said earphone part having a ridge abutting said lateral edge to form a stop for said handset.

3. A telephone set as claimed in claim 2 wherein said flanges have curved upper ends.

4. A telephone set as claimed in claim 3 wherein said handle part has a flat section and said microphone part and earphone part have rounded sections.

* * * * *